United States Patent
Gronau et al.

(10) Patent No.: US 7,267,412 B2
(45) Date of Patent: Sep. 11, 2007

(54) METHOD FOR DETERMINING OR CALIBRATING THE BRAKE CONTROL CHARACTERISTIC OF A VACUUM BRAKE BOOSTER

(75) Inventors: Ralph Gronau, Wetter (DE); Ralf Reviol, Dietzenbach-Steinberg (DE); Tobias Scheller, Frankfurt am Main (DE); Andreas Neu, Kuhardt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 32 days.

(21) Appl. No.: 10/503,675

(22) PCT Filed: Dec. 3, 2002

(86) PCT No.: PCT/EP02/13642

§ 371 (c)(1),
(2), (4) Date: Aug. 2, 2004

(87) PCT Pub. No.: WO03/066405

PCT Pub. Date: Aug. 14, 2003

(65) Prior Publication Data

US 2005/0156465 A1    Jul. 21, 2005

(30) Foreign Application Priority Data

Feb. 7, 2002 (DE) .................. 102 05 171
Feb. 7, 2002 (DE) .................. 102 05 172
Sep. 26, 2002 (DE) .................. 102 44 761

(51) Int. Cl.
*B60T 8/34* (2006.01)
(52) U.S. Cl. ............................ 303/114.3
(58) Field of Classification Search ......... 303/114.3, 303/113.3, DIG. 4, 115.1, 114.1; 188/356
See application file for complete search history.

(56) References Cited

U.S. PATENT DOCUMENTS

| | | | | |
|---|---|---|---|---|
| 5,727,852 A | * | 3/1998 | Pueschel et al. | 303/113.4 |
| 5,855,420 A | * | 1/1999 | Lawrence | 303/113.4 |
| 6,289,271 B1 | * | 9/2001 | Isono et al. | 701/31 |
| 6,318,815 B1 | | 11/2001 | Haupt et al. | |
| 6,361,126 B1 | * | 3/2002 | Pueschel et al. | 303/114.3 |

(Continued)

FOREIGN PATENT DOCUMENTS

DE    44 36 297 A1    4/1996

(Continued)

OTHER PUBLICATIONS

German Search Report of Application No. 102 44 761.6 dated Sep. 26, 2002.

(Continued)

*Primary Examiner*—Christopher P. Schwartz
(74) *Attorney, Agent, or Firm*—RatnerPrestia

(57) ABSTRACT

In a method for determining or calibrating the brake control characteristic of a vacuum brake booster of a vehicle brake system, the pressure in the working chamber or the pressure difference between the working chamber and the vacuum chamber of the vacuum brake booster is determined, and either the brake control characteristic is determined on the basis of the determined pressure or pressure difference of the vacuum brake booster, or the stored brake control characteristic is changed according to the determined pressure or pressure difference.

14 Claims, 2 Drawing Sheets

U.S. PATENT DOCUMENTS

| | | | |
|---|---|---|---|
| 6,516,701 B1 * | 2/2003 | Drott et al. | 91/367 |
| 6,666,530 B2 * | 12/2003 | Mizutani et al. | 303/114.3 |
| 6,755,112 B2 * | 6/2004 | Burgdorf et al. | 91/1 |
| 6,755,486 B2 * | 6/2004 | Nishio et al. | 303/114.3 |
| 6,871,918 B2 * | 3/2005 | Wild et al. | 303/122.09 |
| 2001/0002767 A1 | 6/2001 | Dieringer et al. | |

FOREIGN PATENT DOCUMENTS

| | | |
|---|---|---|
| DE | 197 29 158 C1 | 10/1998 |
| DE | 199 25 794 A1 | 12/2000 |
| DE | 100 28 691 A1 | 9/2001 |
| DE | 102 18 972 A1 | 2/2003 |
| EP | 0 827 887 A2 | 3/1998 |
| FR | 2 817 225 A1 | 5/2002 |

OTHER PUBLICATIONS

International Search Report of Application No. PCT/EP02/13642 dated Mar. 6, 2003.

* cited by examiner

US 7,267,412 B2

METHOD FOR DETERMINING OR CALIBRATING THE BRAKE CONTROL CHARACTERISTIC OF A VACUUM BRAKE BOOSTER

TECHNICAL FIELD

The present invention relates to a method for determining or calibrating the brake control characteristic of a vacuum brake booster of a vehicle brake system.

The invention also relates to a calibration device for the characteristic curve of a vacuum brake booster of a vehicle brake system, including a vacuum housing that is subdivided by at least one movable partition into at least one vacuum chamber and at least one working chamber, and including a sensor unit for sensing pressures in the vacuum brake booster.

BACKGROUND OF THE INVENTION

The braking pressure results from the pedal force and the auxiliary force, which is produced from the pressure difference between the working chamber and the vacuum chamber (low-pressure chamber) of the vacuum brake booster. The auxiliary force component is constantly increasing corresponding to a boosting factor defined by construction until the point of maximum boosting. The maximum pressure difference is reached in the point of maximum boosting. A further rise of the output force is only possible by an unusual increase of the brake application force, in particular the pedal force. The point of maximum boosting lies at a defined hydraulic pressure (maximum boosting pressure) of a master brake cylinder succeeding the vacuum brake booster.

The term 'brake control characteristic' herein and in the following implies a characteristic curve of a vacuum brake booster which represents the correlation between a vacuum or low pressure prevailing in the vacuum chamber or low-pressure chamber of the vacuum brake booster and a resulting brake pressure or a brake force (maximum boosting pressure or maximum boosting force) being at their maximum under the given conditions.

A driving motor (internal combustion engine) generally supplies the vacuum for the vacuum brake booster. If the maximally attainable boosting force is insufficient due to an only weak vacuum supply, which is a more frequent case in novel engine technology such as a direct gasoline injection system or Diesel engine, there is need for an additional brake boost. One possibility of producing an additional brake force or an additional brake pressure involves the use of 'active' hydraulic brake boost. This is achieved e.g. by means of a hydraulic pump. The hydraulic pressure, which results in the hydraulic master brake cylinder from the brake force that is introduced by the driver by way of the brake pedal and boosted by means of a vacuum brake booster, is additionally increased by the hydraulic pump. Said pump is driven by an electric motor actuated by an electronic brake control unit.

It is necessary in systems of this type to determine the brake control characteristic and the point of maximum boosting of the vacuum brake booster. The reason is that this point determines the point of transition between the brake boost by way of the vacuum and the assistance by way of the hydraulic pump. The brake control characteristic and the point of maximum boosting or maximum boosting pressure depend on various parameters such as the membrane surface of the vacuum brake booster, vacuum level and master cylinder pressure. Due to e.g. tolerances of the components concerned, it is problematic to fix a sufficiently precise brake control characteristic and a precise point of maximum boosting or maximum boosting pressure.

It is known in the art to employ pressure sensors in/on vacuum brake boosters to sense and evaluate a pressure difference between the low-pressure chamber or vacuum chamber and the working chamber.

DE 44 36 297 C2 discloses a vacuum brake booster and a method of operating a vehicle brake system, wherein the detected pressure difference is evaluated for the actuation of a control valve in the vacuum brake booster.

DE 197 29 158 C2 discloses a vacuum brake booster with a control unit carrying two pressure sensors with two air ducts that extend into the low-pressure chamber and the working chamber of the vacuum brake booster. The control unit is used to control the vacuum brake booster.

BRIEF SUMMARY OF THE INVENTION

An object of the invention is to provide a method and a device that allow reliably and precisely determining a characteristic curve of a vacuum brake booster and a point of maximum boosting.

According to the invention, this object is achieved by the features of the independent patent claims.

The dependent sub claims indicate particularly favorable improvements and embodiments of the invention.

The object to be solved by the invention is achieved by a method for determining or calibrating the brake control characteristic of a vacuum brake booster of a vehicle brake system wherein the pressure in the working chamber or the pressure difference between the working chamber and the vacuum chamber of the vacuum brake booster is determined, and either the brake control characteristic is determined on the basis of the determined pressure or pressure difference of the vacuum brake booster, or a predetermined or stored brake control characteristic is modified according to the determined pressure or pressure difference.

It is possible by determining the pressure in the working chamber or the pressure difference between the working chamber and the vacuum chamber of the vacuum brake booster to determine a brake control characteristic of the vacuum brake booster relatively precisely, or to adapt a predefined or a current, stored brake control characteristic to the determined values or modify it. Subsequently, it can be found out reliably during braking of the vehicle when the point of maximum boosting is reached and a corresponding brake control must be carried out.

The pressure difference between the working chamber and the vacuum chamber of the vacuum brake booster defines the currently adjusted pneumatic brake boost. The pressure difference can be defined from the difference between a measured pressure or vacuum in the working chamber and the vacuum chamber. Therefore, it is preferred to measure the pressure in the working chamber and the vacuum chamber of the vacuum brake booster.

The invention arranges that a hydraulic pressure in the vehicle brake system, in particular in a master brake cylinder, is determined, and that the brake control characteristic is determined on the basis of the determined pressure or pressure difference of the vacuum brake booster and the determined hydraulic pressure, or a predefined or stored brake control characteristic is modified according to the determined pressure or pressure difference of the vacuum brake booster and the determined hydraulic pressure.

A determined hydraulic pressure, in particular a pressure in the master brake cylinder, is associated with the determined pressure or pressure difference of the vacuum brake booster. This allocation corresponds to the correlation between the pressure in the vacuum chamber and the maximum boosting pressure. A brake control characteristic can be determined directly from these pairs of values by interpolation or extrapolation. Preferably, the characteristic curve is determined by way of several pairs of values or 'reference points'.

The hydraulic pressure is preferably measured by means of a pressure sensor already provided in the vehicle, as it is available e.g. in brake systems with driving dynamics control (ESP).

It is provided by the invention that a first brake control characteristic is predefined and this predefined first brake control characteristic is modified or corrected according to the determined pressure or pressure difference of the vacuum brake booster and the determined hydraulic pressure.

The maximum boosting pressure can be determined and stored already before the first brake application is carried out by the driver in that the pressure in the vacuum chamber is measured and a corresponding maximum boosting pressure is fixed on the basis of the 'basic characteristic curve'.

The 'basic characteristic curve' does not yet take into account all tolerances of the respective components of the brake booster, master brake cylinder and the sensors. According to the invention, these tolerances are 'learnt' on-line, i.e. while the vehicle is driving, in particular during a braking operation, and the predetermined or currently stored brake control characteristic is correspondingly adapted or corrected according to the determined discrepancies.

Thus, it is arranged for that a predetermined brake control characteristic is adapted to system-induced tolerances at least one time in order to minimize discrepancies between the 'true', that means the actually existing, characteristic curve and the predefined characteristic curve. Advantageously, the first braking of the vehicle is still carried out at the premises of the vehicle maker. Then the basic characteristic curve can be corrected for a first time, with the result that the control and the pedal feeling are already optimized for the vehicle's end user. Subsequent additional adaptations after the first correction are normally scarcely perceptible to the driver, or not perceptible at all.

It is further provided that even after an adaptation once carried out, this adapted or modified brake control characteristic is stored and also corrected accordingly based on further discrepancies determined. This allows more closely approximating the currently stored characteristic curve to the 'true' brake control characteristic. In addition, changes of the system occurring in the course of time such as conditions of wear will be taken into consideration. The current brake control characteristic is preferably stored in a memory such as an EPROM where values are saved as long as the ignition is turned on.

The determination is preferably effected by way of the evaluation of pairs of values at predetermined 'reference points' by monitoring with each braking operation or a defined number of braking operations whether a pressure difference or a corresponding pressure corresponding to a selected reference point occurs and by additionally measuring and storing the hydraulic pressure. The selection and classification of the reference points can take place in fixed steps or in dependence on the current actuation. Preferably, the associated gradients of the hydraulic pressure are also stored with the individual reference points. Said gradients result especially from the speed of the application of the brake pedal by the driver and are used as a criterion for the quality of measurement. Later measurements at the reference points are only taken into account when the occurring pressure gradient is lower than the one stored last.

According to the invention, the brake control characteristic is determined or the stored brake control characteristic is modified or corrected according to the determined pressure or pressure difference when the gradient of the hydraulic pressure is lower than 40 to 60 bar/sec, preferably lower than roughly 50 bar/sec. Generally, the speeds of the brake application are in such a range that the gradient of the hydraulic pressure lies below this limit value. When the gradient lies below 40 bar/sec approximately, the measurements at different times or braking operations can be regarded as equivalent. Braking with a gradient of this type can be considered as quasi stationary.

According to the invention, a brake control characteristic is also determined or corrected by extrapolation of measured values. This is because beyond the pressure introduced by the driver, the brake control characteristics are principally similar so that an extrapolation is expediently possible. Therefore, measurements that do not cover the overall range of a characteristic curve because e.g. the vacuum is insufficient or there was no corresponding brake application are taken into consideration, and the difference between the last valid measured value and the value of the stored or predefined characteristic curve is added to still missing measured values. This procedure allows even reference points, which are reached more rarely or measured only with high pressure gradients, to approximate the real characteristic curve.

It is arranged for that a 'final' adaptation or correction of the brake control characteristic is performed only when a defined, relatively high hydraulic pressure has already been reached, which corresponds to an approximation of the point of maximum boosting. According to the method, the characteristic curve can, however, also be adapted, at least temporarily, before a high hydraulic pressure is reached. As an alternative or in addition, reaching a relatively high pressure in the working chamber which corresponds to a pressure of the ambient atmosphere can be evaluated as an indication of an approach to the point of maximum boosting.

According to the invention, a measured value is taken into consideration when the following conditions are satisfied:
a) The gradient of the hydraulic pressure is lower than 60 bar/sec, preferably lower than 50 bar/sec.
b) The gradient of the hydraulic pressure exceeds zero.
c) The current gradient of the hydraulic pressure is lower than the gradient when determining the valid (current) brake control characteristic.
d) There is no active braking intervention of an electronic brake control, such as anti-lock system (ABS), driving dynamics control (ESP), traction slip control (TCS), brake assist (HBA) or automatic cruise control (ACC).
e) The vacuum is sufficient, i.e. the vacuum in the vacuum chamber is lower than 50 millibar, preferably lower than 100 millibar.
f) The reference point is sufficiently precise, that means the discrepancy of the determined pressure difference between working chamber and vacuum chamber from the predefined reference point is lower than ±50 millibar, preferably lower than ±40 millibar, and
g) the change with respect to the previous or predefined measured value is of a sufficient amount, in particular higher than 1.2 bar, preferably higher than 1.0 bar.

According to the invention, the determination and/or adaptation of the brake control characteristic also comprises detecting the requirement of an additional brake boost, and an active hydraulic brake boost is activated only in case of need, when the requirement of an additional brake boost for the driver was detected.

According to the invention, the determination and/or adaptation of the brake control characteristic also comprises detecting that the point of maximum boosting is reached or at least an approximation of the point of maximum boosting, and the active hydraulic brake boost is activated only if the reaching of the point of maximum boosting or at least the approximation of the point of maximum boosting was detected.

According to the invention, the boosting force of the vacuum brake booster and/or of the hydraulic brake boost is adjustable according to further functions of the brake control system such as brake assist (BA) or driving dynamics control (ESP).

The object of the invention is also achieved by a calibration device for the characteristic curve of a vacuum brake booster of a vehicle brake system, including a vacuum housing that is subdivided by at least one movable partition into at least one vacuum chamber and at least one working chamber, and including a sensor unit for sensing pressures in the vacuum brake booster, wherein the purpose of the sensor unit is to sense the pressure in the vacuum chamber and the pressure in the working chamber or the pressure difference between the working chamber and the vacuum chamber and to send the values to the calibration device, and the calibration device includes an evaluating unit for the purpose of evaluation of the determined pressure or pressure difference and determination of a brake control characteristic or adaptation of a stored brake control characteristic according to the measured pressures or pressure differences.

According to the invention, the determined pressure or pressure difference during several braking operations of the vehicle is evaluated, and a brake control characteristic is determined therefrom, or a stored brake control characteristic is adapted according to the measured pressures or pressure differences.

DETAILED DESCRIPTION OF THE PREFERRED EMBODIMENTS

Figure 1:
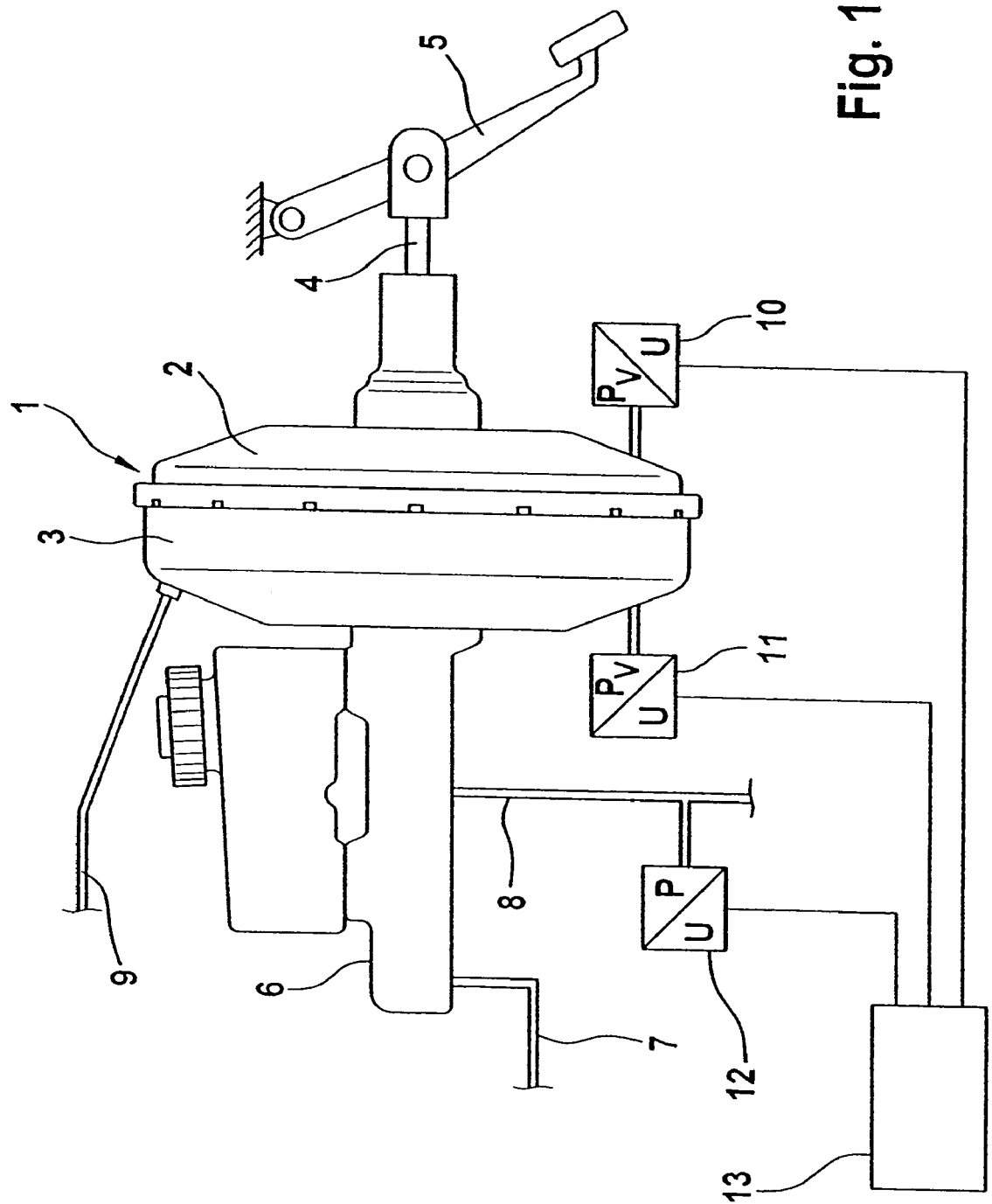
FIG. 1 is a schematic view of a brake actuation device with a calibration device.

FIG. 1 depicts a brake actuation device with a calibration device according to the invention. The brake actuation device includes a vacuum brake booster 1 which is subdivided into at least one working chamber 2 and a vacuum chamber 3. The vacuum brake booster is operable by an actuating rod 4 by way of a brake pedal 5, with the result of actuation of a tandem master brake cylinder 6 adjacent to the vacuum brake booster 1. Tandem master brake cylinder 6 includes hydraulic ports 7, 8 connected to the wheel brakes of the vehicle. The vacuum chamber 3 is connected through a port 9 to a continuously operating low-pressure source or vacuum source (not shown).

Sensors 10, 11 are associated with the calibration device. The first sensor 10 is used to measure the (vacuum) pressure in the working chamber 2, and the second sensor 11 is used to measure the (vacuum) pressure in the vacuum chamber 3. The hydraulic pressure of the tandem master brake cylinder 6 is determined at least for one brake circuit by a hydraulic pressure sensor 12.

When the pedal 5 is actuated and, thus, rod 4 displaced, a valve in the inside of the vacuum brake booster 1 is actuated, and first a connection between vacuum chamber 3 and working chamber 2 is separated. The valve opens a connection to the outside air in the further course of the movement. The vacuum starts boosting the force introduced by the brake pedal 5. A hydraulic pressure developing in the master brake cylinder 6 is used to apply brake pressure to the wheel brakes of the vehicle.

Each change in the pedal force increases or decreases the pressure difference between the working chamber 2 and the vacuum chamber 3. Said pressure difference is found out by means of sensors 10, 11. Sensor 12 also determines the hydraulic pressure resulting therefrom. The measured values are evaluated in an electronic controlling and regulating unit 13. The correlation between the hydraulic pressure and the differential pressure in the vacuum brake booster 1 is stored. A characteristic curve for the calibration of the brake control characteristic of the vacuum brake booster 1 is determined in consideration of various situations of maximum boosting of the vacuum brake booster 1.

When the pedal is depressed further, air flows out of the atmosphere through the valve into the working chamber 2. The resulting pressure difference from the working chamber 2 to the vacuum chamber 3 tends to displace a partition between the working chamber 2 and the vacuum chamber 3 until finally the pressure in the working chamber 2 corresponds to the atmospheric pressure, while the pressure of the vacuum chamber 3 corresponds to a vacuum generated due to the connected vacuum source. This situation corresponds to the brake's fully applied position of the vacuum brake booster. The maximum possible boosting force of the vacuum brake booster is given, the point of maximum boosting is reached. Further increase of the force is possible only by a still higher pedal force applied by the driver.

The controlling and regulating unit 13 is used to determine the respective vacuum in the vacuum brake booster and the respective corresponding hydraulic maximum boosting pressure. When it is found out in a comparison with the calibration characteristic curve (correlation between pressure difference between the chambers of the vacuum brake booster and the hydraulic maximum boosting pressure) that the current hydraulic pressure exceeds the maximum possible boosting pressure, the controlling and regulating unit 13 will produce an actuating signal for an active hydraulic brake boost, with the aim of building up an additional hydraulic pressure, e.g. by actuation of a hydraulic pump.

FIG. 1 depicts the sensors 10, 11 as two separate modular units for reasons of clarity. However, the design with two sensor elements in one common housing is preferred. A 'double pressure sensor' of this type can be dealt with as one sensor during the entire process chain from the manufacturer of the sensors via the manufacturer of the vacuum brake booster 1 up to the vehicle maker. Advantages with respect to cost and assembly are thereby achieved. In a particularly preferred embodiment, the sensor housing is integrated at least in part into the vacuum housing of the vacuum brake booster 1, thereby reducing the space requirement in the engine compartment.

Figure 2:
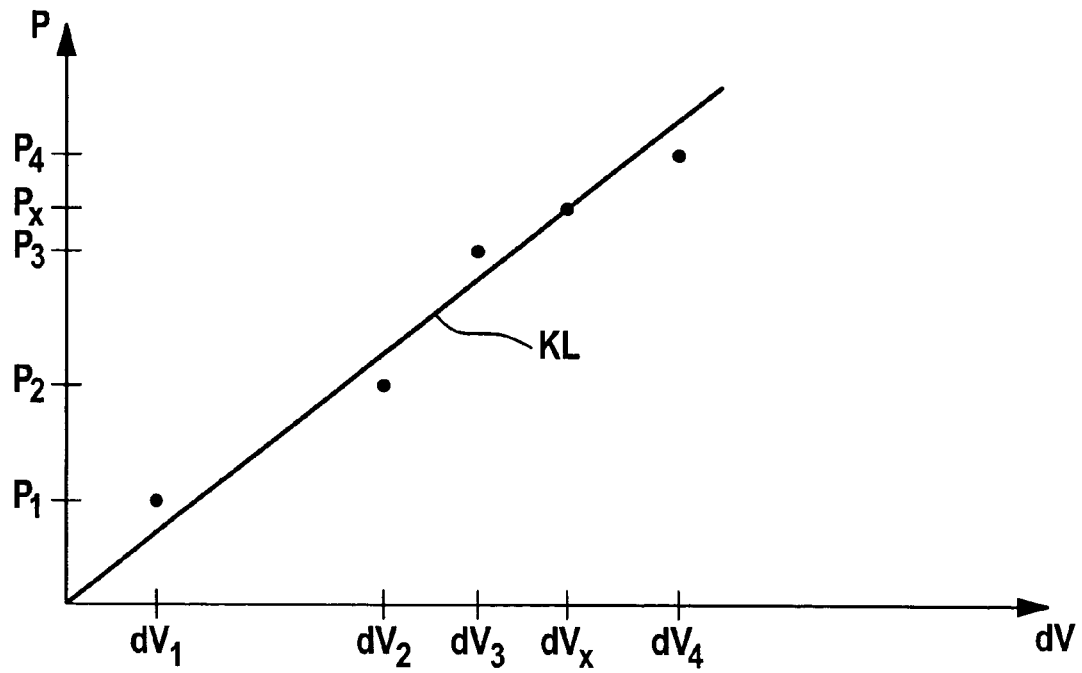
FIG. 2 is a schematic view of a determined calibration characteristic curve.

FIG. 2 schematically depicts a determined calibration characteristic curve, brake control characteristic, plotting the brake pressure P as a function of the pressure difference between vacuum and working chamber dV. This calibration characteristic curve was determined on the basis of measured pressure differences dV in the brake booster 1 and the associated hydraulic pressure P (brake pressure in the tandem master cylinder). The pressure difference determined by the sensors 10, 11 defines the currently adjusted brake boost. Associated with the pressure differences $dV_1$ to $dV_4$ are the respectively corresponding, i.e. currently measured, hydraulic pressures $P_1$ to $P_4$. The result is a calibration characteristic curve KL (solid line) averaged by way of the reference points ($dV_1/P_1$; $dV_2/P_2$; $dV_3/P_3$; $dV_4/P_4$). A further rise of the brake pressure P is possible from these points on only by means of an increase of the pedal force to be produced by the driver.

Figure 3:
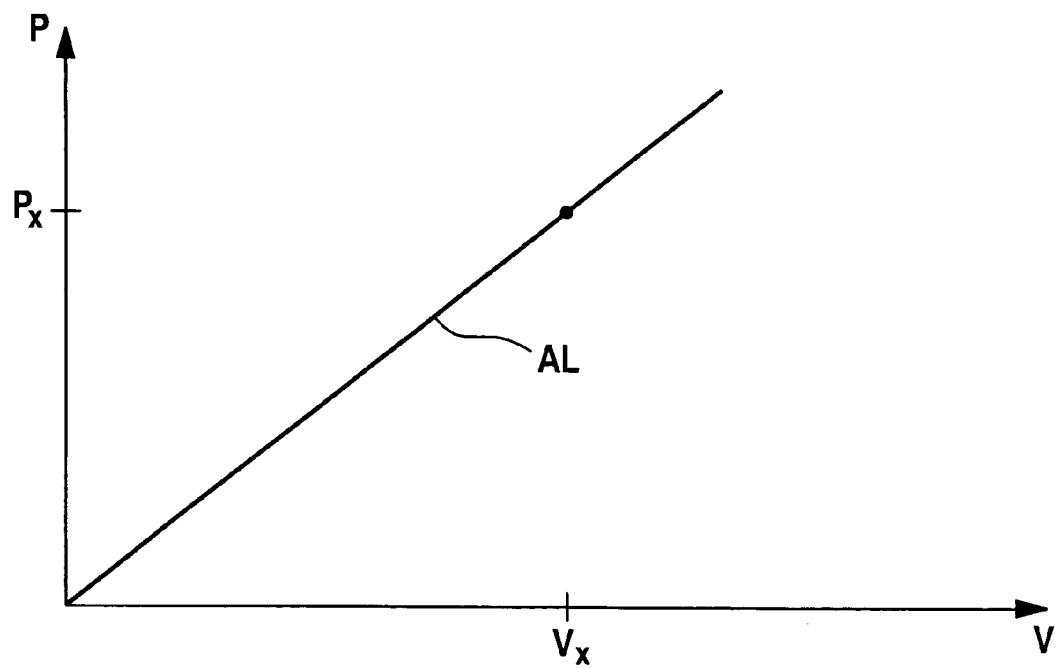
FIG. 3 is a schematic view of the determined brake control characteristic from the calibration characteristic curve.

The point of maximum boosting A with an associated maximum boosting pressure $P_A$ can be associated with a pressure in the vacuum chamber V by the determined and stored characteristic curve of the calibration according to FIG. 2. FIG. 3 shows a like illustration of the brake control characteristic AL out of the calibration characteristic curve KL in FIG. 2. Thus, it is possible to calibrate or adapt the brake control characteristic AL by means of the calibration characteristic curve KL.

It can be taken from the calibration characteristic curve KL that e.g. the pressure difference dVx corresponds to a hydraulic maximum boosting pressure Px. With a measured vacuum pressure of Vx corresponding to the pressure difference (Vx=dVx), the hydraulic maximum boosting pressure Px should also prevail (FIG. 3). The 'calibrated' brake control characteristic AL will thus allow a reliable and precise determination of the point of maximum boosting A.

When the point of maximum boosting is then exceeded and the driver demands a continued or higher vehicle deceleration, it is arranged for to increase the brake pressure P by means of hydraulic boosting by a pump. Hydraulic boosting is adjusted corresponding to the boosting factor or the inclination of the brake control characteristic AL up to a maximum required brake pressure. As the determined characteristic curve AL is in very good approximation of the 'true' characteristic curve or even corresponds to it, no change of the characteristics of brake control is imparted to the driver, so that his/her pedal feeling stays the same. Hence, the invention enhances the operating convenience for the driver.

The invention claimed is:

1. Method for calibrating a brake control characteristic of a vacuum brake booster of a vehicle brake system, comprising:
   storing an initial brake control characteristic;
   determining a pressure or pressure difference of the vacuum brake booster; and
   modifying the stored brake control characteristic based on the determined pressure or pressure difference, wherein the brake control characteristic is modified by extrapolation of measured values and a currently measured value is taken into consideration when the following conditions are satisfied:
   a) a gradient of the hydraulic pressure is lower than 60 bar/sec;
   b) the gradient of the hydraulic pressure exceeds zero;
   c) the gradient of the hydraulic pressure currently is lower than the gradient of hydraulic pressure when the current brake control characteristic was determined;
   d) there is no active braking intervention of an electronic brake control;
   e) a vacuum in a vacuum chamber of the vacuum brake booster is lower than 100 millibar;
   f) a difference between a currently determined pressure difference of the vacuum brake booster and a previously determined pressure difference of the vacuum brake booster is lower than ±50 millibar; and
   g) a difference between the currently measured value and a previous or predefined measured value is greater than or equal to 1.0 bar.

2. Method as claimed in claim 1 wherein modifying the brake control characteristic also comprises detecting a requirement of an additional brake boost, and wherein an active hydraulic brake boost is activated only when the requirement of the additional brake boost was detected.

3. Method as claimed in claim 2 further comprising:
   detecting whether a point of maximum boosting or an approximation of the point of maximum boosting is reached, and wherein the active hydraulic brake boost is activated only if a reaching of the point of maximum boosting or the approximation of the point of maximum boosting was detected.

4. Method as claimed in claim 3 wherein a boosting force of the vacuum brake booster and/or of the hydraulic brake boost is adjustable according to further functions of the brake control system.

5. Method as claimed in claim 4 wherein the brake control system includes a brake assist (BA) or a driving dynamics control (ESP).

6. Method as claimed in claim 1, further comprising:
   determining a hydraulic pressure in the vehicle brake system; and
   modifying the stored brake control characteristic based on the determined pressure or pressure difference of the vacuum brake booster and the determined hydraulic pressure.

7. Method as claimed in claim 1 wherein the initial brake control characteristic is a predefined brake control characteristic.

8. Method as claimed in claim 1 wherein the initial brake control characteristic is a first sensed brake control characteristic.

9. Method as claimed in claim 1 wherein modifying the stored brake control characteristic occurs only when a speed of actuation of a brake actuation device is lower than 60 bar/sec.

10. Method as claimed in claim 1 wherein modifying the stored brake control characteristic occurs only when a speed of actuation of a brake actuation device is lower than 40 bar/sec.

11. Method as claimed in claim 1 wherein the vacuum in the vacuum chamber of the vacuum brake booster is lower than 50 millibar.

12. Method as claimed in claim 1 wherein the difference between a currently determined pressure difference of the vacuum brake booster and the previously determined pressure difference of the vacuum brake booster is lower than ±40 millibar.

13. Method as claimed in claim 1 wherein the difference between the currently measured value and the previous or predefined measured value is greater than or equal to 1.2 bar.

14. Method as claimed in claim 1 wherein the electronic brake control may be an anti-lock system (ABS), a driving dynamics control (ESP), a traction slip control (TCS), a brake assist (HBA), or an automatic cruise control (ACC).

* * * * *